(12) United States Patent
Spiering

(10) Patent No.: US 11,577,158 B2
(45) Date of Patent: Feb. 14, 2023

(54) SYSTEMS, DEVICES, AND METHODS FOR ADAPTING A THUMBSTICK OF A CONTROLLER

(71) Applicant: Eric Spiering, Spokane, WA (US)

(72) Inventor: Eric Spiering, Spokane, WA (US)

(*) Notice: Subject to any disclaimer, the term of this patent is extended or adjusted under 35 U.S.C. 154(b) by 0 days.

(21) Appl. No.: 17/187,021

(22) Filed: Feb. 26, 2021

(65) Prior Publication Data

US 2022/0274012 A1 Sep. 1, 2022

(51) Int. Cl.
*A63F 13/24* (2014.01)
*G05G 1/06* (2006.01)

(52) U.S. Cl.
CPC ............... *A63F 13/24* (2014.09); *G05G 1/06* (2013.01); *A63F 2300/1043* (2013.01)

(58) Field of Classification Search
None
See application file for complete search history.

(56) References Cited

U.S. PATENT DOCUMENTS

| | | | |
|---|---|---|---|
| 5,883,690 A | 3/1999 | Meyers et al. | |
| D655,350 S * | 3/2012 | Taniguchi | D21/333 |
| D678,284 S * | 3/2013 | Coulter | D14/412 |
| D762,781 S * | 8/2016 | Mistry | D14/401 |
| 9,804,691 B1 * | 10/2017 | Strahle | G06F 3/033 |
| D868,163 S * | 11/2019 | Mistry | D21/333 |
| 10,463,977 B1 * | 11/2019 | Houlihan | A63F 13/24 |
| 10,940,386 B2 * | 3/2021 | Ironmonger | A63F 13/24 |
| 2006/0003840 A1 * | 1/2006 | Bailey | A63F 13/02 463/36 |
| 2009/0239665 A1 * | 9/2009 | Minuto | A63F 13/08 463/38 |
| 2010/0167825 A1 * | 7/2010 | Sternberg | A63F 13/98 463/47 |
| 2012/0050232 A1 * | 3/2012 | Ikeda | A63F 13/24 345/184 |
| 2017/0106274 A1 * | 4/2017 | Ramcheran | A63F 13/24 |
| 2020/0179799 A1 * | 6/2020 | Ramcheran | A63F 13/98 |
| 2020/0218305 A1 * | 7/2020 | Chan | G05G 5/06 |

FOREIGN PATENT DOCUMENTS

| | | | | |
|---|---|---|---|---|
| WO | WO-2010018279 A1 * | 2/2010 | | A63F 13/98 |
| WO | WO-2017006292 A1 * | 1/2017 | | |

* cited by examiner

*Primary Examiner* — Tramar Harper

(74) *Attorney, Agent, or Firm* — Cooley LLP

(57) ABSTRACT

Systems, apparatus, and methods are described for adjusting a thumbstick of a controller, such as adjusting a height and/or other characteristic of the thumbstick. Systems, apparatus, and methods can include one or more of a base element, an adjustment element, and a cap element, which can couple to one another to form an interlocked or stacked configuration that, when coupled to the thumbstick, can adjust the thumbstick of the controller.

20 Claims, 10 Drawing Sheets

SYSTEMS, DEVICES, AND METHODS FOR ADAPTING A THUMBSTICK OF A CONTROLLER

TECHNICAL FIELD

The present disclosure relates generally to systems, apparatus, and methods for adapting a handheld controller such as, for example, a game controller, and in particular, to systems and devices for attaching to a thumbstick of a controller and adapting one or more characteristics (e.g., height, size, etc.) of the thumbstick, and associated methods of assembly and use.

BACKGROUND

Handheld controllers are commonly used in the gaming industry to control and/or manipulate objects (e.g., characters, items, etc.) within a game. In a typical form for use in home videogame consoles, game controllers can include a joystick or thumbstick and one or more buttons. Earlier variants of home videogame controllers included a single joystick, but those variants have been replaced more recently with two joysticks that are designed to be manipulated by thumbs of a user, thus leading to them being referred to as thumbsticks.

With the popularization of home videogame systems, manufacturers of videogame controllers have modified the arrangement, size, and/or other features of the controller over time. Eventually, the height and/or design of thumbsticks became conventional, as most videogame controllers settled on an equal height and size for thumbsticks. As the nature of games have changed, however, certain requirements such as, for example, pointing precision have become more important. It can therefore be desirable to have thumbstick attachments that modify a height and/or size of a thumbstick to suit these requirements and/or tailor game controllers for particular games.

SUMMARY

Systems, devices, and methods described herein generally relate to systems and devices for attaching to a thumbstick of a controller and adapting one or more characteristics (e.g., height, size, etc.) of the thumbstick.

In some embodiments, a kit for adjusting a height of a thumbstick of a controller, includes: a base element including: a first coupling mechanism disposed on a top surface of the base element; and a second coupling mechanism configured to removably attach to a top portion of the thumbstick, the second coupling mechanism disposed on a bottom surface of the base element; and at least one adjustment element, each adjustment element including: a third coupling mechanism disposed on a top surface of the adjustment element; and a fourth coupling mechanism configured to removably attach to one of the first coupling mechanism or the third coupling mechanism, such that each adjustment element is removably coupled to one of the base element or another adjustment element, the fourth coupling mechanism disposed on a bottom surface of each adjustment element; and a cap element including: a fifth coupling mechanism configured to removably attach to one of the first coupling mechanism or the third coupling mechanism, such that the cap element is removably coupled to one of the base element or an adjustment element, the fifth coupling mechanism disposed on a bottom surface of the cap element; and a top portion having a diameter similar to that of the thumbstick, the top portion configured for engagement with a thumb of a user of the controller.

In some embodiments, a system includes: a controller including a thumbstick; a base element removably coupleable to a top portion of the thumbstick; a set of one or more adjustment elements removably coupleable to the base element and to one another, the set of adjustment elements configured to be arranged in a stacked configuration in which each adjustment element is stacked on top of another adjustment element or the base element to form a stacked column; and a cap element removably coupleable to the base element and the set of adjustment elements, the base element, the set of adjustment elements, and the cap element, when coupled to the thumbstick via the base element, is configured to increase a height of the base element by a predefined value.

In some embodiments, a method for adjusting a height of a thumbstick of a controller includes: attaching a base element to a top portion of the thumb stick; attaching a set of one of more adjustment elements to the base element in a stacked configuration in which each adjustment element from the set of adjustment elements is stacked on top of another adjustment element or the base element to form a stacked column; and attaching a cap element to a top most adjustment element from the set of adjustment elements.

Other systems, processes, and features will become apparent to those skilled in the art upon examination of the following drawings and detailed description. It is intended that all such additional systems, processes, and features be included within this description, be within the scope of the present disclosure, and be protected by the accompanying claims.

BRIEF DESCRIPTION OF THE DRAWINGS

The drawings are not necessarily to scale. The drawings are merely schematic representations, not intended to portray specific parameters of the invention. The drawings are intended to depict only typical embodiments of disclosed systems, apparatus, and methods. In the drawings, like reference characters refer to like elements (e.g., functionally similar and/or structurally similar elements).

DETAILED DESCRIPTION

Figure 1:
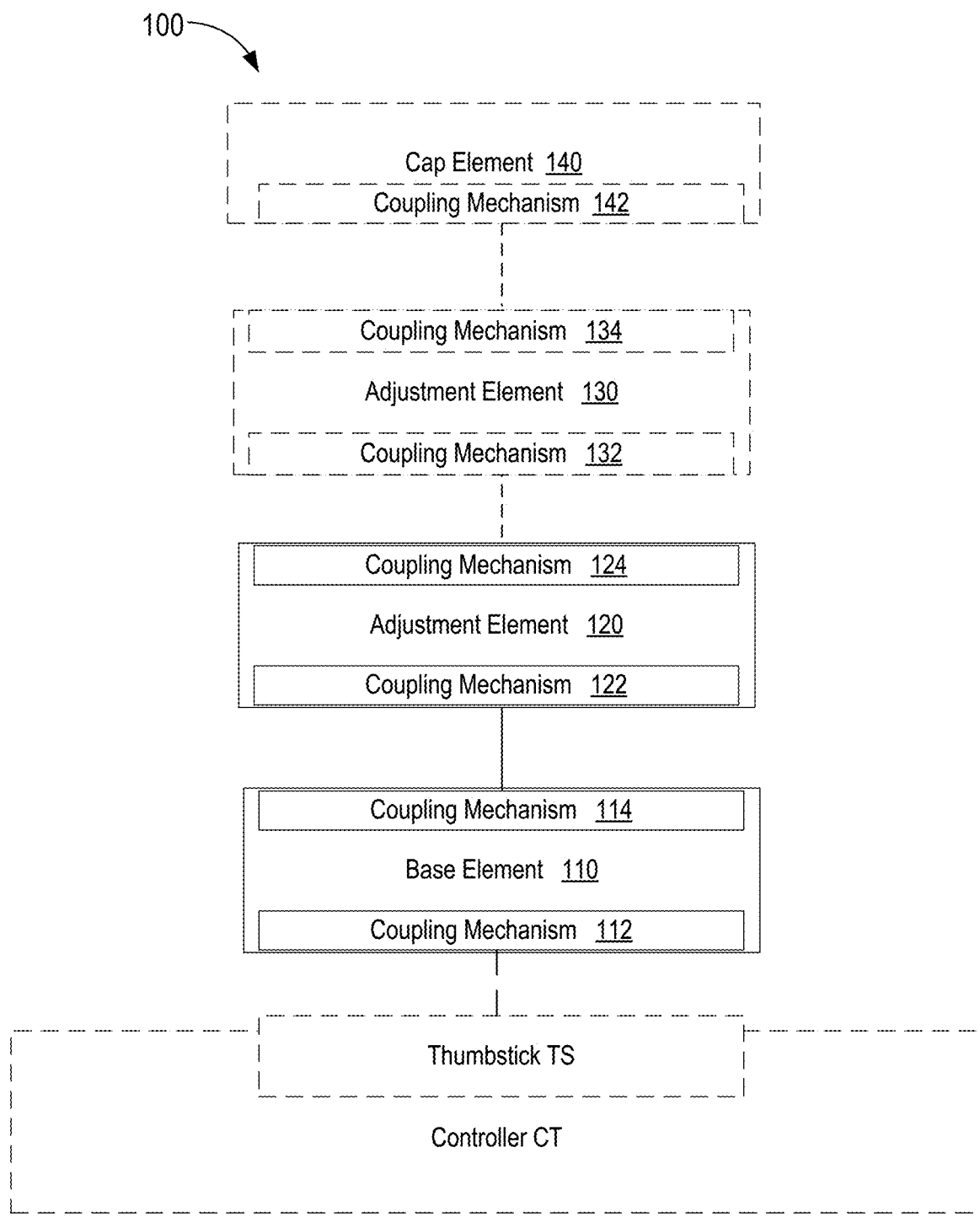
FIG. 1 is a schematic diagram of a system for adapting a thumbstick of a controller, according to embodiments.

Embodiments of the present disclosure are directed to systems, apparatus, and methods for attaching to a thumbstick of a controller and adapting one or more characteristics (e.g., height, size, etc.) of the thumbstick.

With the inception of video games, users have interacted with those games with control devices, including, for example, joysticks and/or buttons. With home videogame consoles, controllers including a joystick and/or buttons are commonly used. In earlier versions, such controllers would include a single joystick, but eventually controllers with two joysticks that are designed to be manipulated by thumbs of a user became common, with such joysticks being referred to as thumbsticks.

Existing controllers typically have two thumbsticks that are of equal height. As the nature of games have changed, certain requirements, including, for example, pointing precision, of a controller have become more important. Such requirements have made it desirable to have controllers that are more optimally designed for such requirements and/or adapted for certain games. Also, with different users (e.g., children and adults) using controllers, it has also become important to have controllers that are adjustable.

Different types of thumbstick attachments can be used to enable more delicate or precise movements with a thumbstick. For example, different types of thumbstick attachments, such as, for example, firm or softer attachments (e.g., firm plastic attachments vs. softer silicone attachments) can provide discrete height options. These thumbstick attachments can be offered in groups of varying sizes (e.g., lengths, diameters), where a user may be required to choose between a limited selection of sizes. The thumbstick attachments can allow users with different sized hands to adapt a thumbstick for their particular use, e.g., a user with larger hands can add attachments to adjust a shorter thumbstick to have a more comfortable height.

In choosing size and/or configuration of a thumbstick, however, a user oftentimes has to test multiple thumbsticks and/or attachments to determine a suitable size and/or configuration. With attachments that are pre-set or are not adjustable, it can be cumbersome and costly for a user to test many different attachments before determining which attachment is suitable for their use. Accordingly, it can be desirable to have attachments for thumbsticks that allow for adjustability, e.g., varying of a height, size, or other parameters of a thumbstick. Moreover, it can be desirable to have attachments that allow for such adjustability to adapt a thumbstick for different users and/or to suit particular games.

Systems, devices, and methods described herein are generally directed to attachments for thumbsticks of controllers that provide adjustability to a thumbstick, such as, for example, a height, size, or other characteristic of a thumbstick. Such systems and methods can provide for such adjustability by having an interlocking system of multiple modular elements that attach to a thumbstick of a controller. For example, a base element can clip or attach onto a controller thumbstick, and one or more height adjusting elements (e.g., wafers) can attach onto the base element and a cap or top can be attached to the other elements for resting a thumb on. The base element can have portions (e.g., appendages) suitable for gripping a thumbstick of a controller sufficiently tight such that the base element is secured to the thumbstick. The base and other elements can be suitably designed (e.g., sized) to not obstruct movement of the thumbstick relative to a body of the controller. The height adjustable elements or wafers can have a height (e.g., thickness) that is sufficient to impart structural strength to the elements when coupled together (e.g., stacked together) and manipulated but be sufficiently thin such that they can allow for suitable height adjustments. The cap or top can be designed for comfortable engagement with a thumb of a user. In some embodiments, the interlocking elements can be coupled to one another via mechanical attachment (e.g., a snap, a clip, a twist lock, a fastening device), while in other embodiments, the interlocking elements can be coupled to one another via magnetic and/or other attachment mechanisms (e.g., a magnetic connection, an adhesive). In some embodiments, a combination of different attachment mechanisms can be used to secure the interlocking elements to each other and to a thumbstick.

FIG. 1 schematically depicts a system 100 for adapting a thumbstick TS of a controller CT, according to embodiments. In an embodiment, the thumbstick TS can be a thumbstick of a game controller, such as a handheld game controller for a home videogame system. The system 100 can include a base element 110 and one or more adjustment elements 120. The base element 110 can be coupleable to the thumbstick TS. In some embodiments, the base element 110 can include a coupling mechanism 112 that is configured to attach to a top portion (e.g., a thumb engagement portion) of the thumbstick TS. The coupling mechanism 112 can include at least one of a mechanical component (e.g., legs, appendages, protrusions, clips, latches, screw threads, etc.), a magnetic component (e.g., a magnet), an adhesive, etc. for coupling the base element 110 to the thumbstick TS.

In some embodiments, the coupling mechanism 112 can include a plurality of clips or appendages that clip around a top portion of the thumbstick TS. In some embodiments, the coupling mechanism 112 can include flexible clips that can flex and/or deform to fit around the top portion of the thumbstick TS. Alternatively or additionally, the coupling mechanism 112 can include clips that are joined to a body of the base element 110 via hinges (e.g., live hinges) that can move between two positions to open and close around the top portion of the thumbstick TS. The clips or appendages of the coupling mechanism 112 (or other coupling features) can be configured to be sufficiently strong to grab onto the top portion of the thumbstick TS, with sizing that is sufficient for reaching around the top portion of the thumbstick TS but small (e.g., short and/or thin) enough to not contact a body of the controller CT when the thumbstick TS is deflected (e.g., fully deflected). In some embodiments, the bottom of the base element 110 (or the coupling element 112) can be configured to mate or fit against the top surface of the thumbstick TS, e.g., to further ensure secure engagement between the base element 110 and the thumbstick TS.

The base element 110 can also include a second coupling mechanism 114 configured to couple to an adjustment element 120, such that one or more adjustment elements 120 can be coupled to the base element 110 to allow for adjustment or variation in a height, size, or other parameter of the thumbstick TS. The second coupling mechanism 114 can be configured to couple to a coupling mechanism 122 of an adjustment element 120. The coupling mechanism 114 and the coupling mechanism 122 can be configured to collectively couple to one another, e.g., in a mating configuration, via screw-in configuration, via magnetic coupling, and the like. In some embodiments, the coupling mechanism 114 can include a portion that fits into a recess of the coupling mechanism 122, and one or more gripping elements (e.g., protrusions or surfaces) can engage the portion of the coupling mechanism 114 to maintain the coupling between the coupling mechanisms 114 and 122. In some embodiments, the second coupling mechanism 114 can be configured to couple to a cap element 140, such that the base element 110 and the cap element 140 are used to increase a height of the thumbstick TS without any adjustment elements 120, 130 being used.

In some embodiments, the adjustment element 120 can be configured to adjust a height or other characteristic of the thumbstick TS. In some embodiments, the adjustment element 120 can be implemented as a wafer, e.g., a circular flat structure. In some embodiments, the adjustment element 120 can include a second coupling mechanism 124 configured to couple to a second adjustment element 130 and/or a cap element 140. In some embodiments, the coupling mechanism 124 can be configured to couple to a coupling mechanism 132 of the second adjustment element 130 or a coupling mechanism 142 of the cap element 140. In some embodiments, the coupling mechanism 124 of the first adjustment element 120 can be substantially similar to the coupling mechanism 114 of the base element 110, and the coupling mechanism 132 of the second adjustment element 130 and the coupling mechanism 142 of the cap element 140 can be substantially similar to the coupling mechanism 122 of the first adjustment element 120. For example, the coupling mechanism 124 and the coupling mechanism 132 or the coupling mechanism 124 and the coupling mechanism 142 can be configured to collectively couple to one another, e.g., in a mating configuration, via screw-in configuration, via magnetic coupling, and the like.

In some embodiments, when the adjustment element 120 is coupled to a second adjustment element 130, the second adjustment element 130 can include a second coupling mechanism 134 that couples to the coupling mechanism 142 of the cap element 140 (or that couples to yet another adjustment element (not depicted)). In some embodiments, two, three, four, five, or more adjustment elements (e.g., adjustment elements 120, 130) can be coupled to one another and to the base element 110, e.g., in a stacked configuration. Specifically, a plurality of adjustment elements (e.g., adjustment elements 120, 130) can be stacked on top of one another to form a column that extends from the base element 110, adding, for example, to a height of a thumbstick TS. The adjustment elements can each have corresponding coupling mechanisms (e.g., coupling mechanisms 122, 124, 132, 134) that allow any one of them to be interchangeable with one another, such that any one of the adjustment elements can be coupled to the base element 110.

In some embodiments, the base element 110 can add a predefined height to the thumbstick TS (e.g., extend or increase a height of the thumbstick TS by a predefined height) when the base element 110 is coupled to the thumbstick TS. In some embodiments, each of the adjustment elements 120, 130 can be configured to add a predefined height to the thumbstick TS when the adjustment elements are coupled to the base element 110 and/or stacked on top of one another. In some embodiments, each of the base element 110 and the adjustment elements 120, 130 can add an equal predefined height to the thumbstick TS. Alternatively, one or more of the base element 110 or the adjustment elements 120, 130 can add different predefined heights to the thumbstick TS. A user in selecting a height for the thumbstick TS can select to stack any number of adjustment elements 120, 130 to the base element 110 to adjust a height of the thumbstick TS. In some embodiments, the base element 110 can add about 1 millimeter (mm), about 2 mm, about 3 mm, or about 5 mm to a height of the thumbstick TS when coupled to the thumbstick TS. In some embodiments, the adjustment elements 120, 130 can each add about 1 mm, about 2 mm, about 3 mm, or about 5 mm to a height of the thumbstick TS when stacked on top of the base element 110. In some embodiments, the cap element 140 can add about 1 mm, about 2 mm, about 3 mm, or about 5 mm to a height of the thumbstick TS when stacked on top of a base element 110 and/or adjustment element 120. In some embodiments, each of the base element 110 and the adjustment elements 120, 130 can add about 1 mm to a height of the thumbstick TS, while the cap element 140 can add about 2 mm to a height of the thumbstick TS. In some embodiments, a combined height that a base element 110, one or more adjustment elements 120, 130, and a cap element 140 can add between about 2 mm to about 20 mm, or between about 2 mm and about 15 mm, or between about 2 mm and about 10 mm, and any other ranges and/or values inbetween. In some embodiments, a smallest configuration of a base element 110 plus a top element 140 can be between about 2 mm and about 5 mm, or be between about 3 mm and about 4.5 mm, and adding adjustment elements 120, 130 between the base element 110 and the top element can increase the height by about 1 mm, 2 mm, 3 mm, 5 mm, 10 mm, or 15 mm, including any ranges or values inbetween.

The cap element 140 can include a surface design for suitable contact with a thumb of a user, e.g., a surface that has sufficient friction, texturing, and/or elasticity (e.g., cushioning and/or softness) for resting a thumb and ensuring sufficient engagement between the thumb and the surface (e.g., sufficient gripping for manipulating the thumbstick TS). In some embodiments, the cap element 140 can be configured to have similar diameter and/or structure as a top portion of the thumbstick TS, e.g., such that the cap element 140 can look and/or feel substantially similar to the top portion of the thumbstick TS. In some embodiments, the cap element 140 can have a surface that is concave, flat, or convex (or a combination of such surfaces) such that the cap element is comfortable for a thumb to rest on. In some embodiments, the cap element 140 can be positioned on top of a top most adjustment element (e.g., an adjustment element 120 or 130 that is most distal to the base element 110) that is stacked on top of and coupled to the base element 110. In some embodiments, the cap element 140 can have a width or diameter that is greater than a width or diameter of the thumbstick TS, such that the cap element 140 offers more engagement surface with a thumb of a user. Alternatively, the cap element 140 can have a width or diameter that is equal to or less than a width or diameter of the thumbstick TS. In some embodiments, the system 100 does not include a cap element 140, and instead each adjustment element 120, 130 (or a subset of adjustment elements) can be configured to have a top surface that is capable of coupling to another adjustment element and/or designed for resting a thumb of a user. In some embodiments, the top most adjustment element in a stack of adjustment elements can function as a cap or top element for resting the thumb.

In some embodiments, one or more of the base element 110, the adjustment elements 120, 130 and/or cap element 140 can have a shape or configuration that, when coupled together, collectively form a structure or shape, e.g., such as a decorative shape, character, etc. In some embodiments, one or more of the base element 110, the adjustment elements 120, 130 and/or cap element 140 can have a shape or configuration that, when coupled together, shift or curve a longitudinal axis of the thumbstick TS (e.g., form a curved or angled stack). Such a configuration can be suitable for, for example, increasing finer manipulations of the thumbstick TS and/or placing a top of the thumbstick TS at a more suitable location for a user (e.g., at a more comfortable location for a user with larger or smaller hands). In some embodiments, one or more of the base element 110, the adjustment elements 120, 130 and/or cap element 140 can have an outer diameter that is greater than, equal to, or less than an outer diameter of the thumbstick TS and/or an outer diameter of any other of the base element 110, the adjustment elements 120, 130 and/or cap element 140.

In some embodiments, the base element 110, the adjustment elements 120, 130 and/or cap element 140 can be formed of a rigid material or a more flexible, pliable material. For example, the base element 110, the one or more adjustment elements 120, 130, and bottom portion of the cap element 140 can be formed of a rigid plastic material, while a top portion of the cap element 140 can be formed of a more pliable material (e.g., for resting a thumb). In some embodiments, the base element 110, the adjustment elements 120, 130 and/or cap element 140 can be formed of a plastic, such as, for example, nylon (e.g., Nylon 12), polyethylene, silicone, etc. In some embodiments, the base element 110, the adjustment elements 120, 130 and/or cap element 140 can be formed of a metal or other rigid material. The material of the base element 110, the adjustment elements 120, 130 and/or cap element 140 can be selected to impart sufficient strength to the respective component while being compatible with interlocking with (e.g., coupling to) neighboring components (e.g., via snap, screw or other twist-type locking, or magnetic coupling). In some embodiments, the base element 110, the adjustment elements 120, 130 and/or cap element 140 can be formed of a plurality of different materials. For example, the cap element 140 can be formed of a more rigid material on the bottom, e.g., for securing to an adjustment element or the base element 110, and a softer material (e.g., silicone) on top, e.g., for resting a thumb.

In some embodiments, one or more different types of base elements 110, adjustment elements 120, 130 and/or cap elements 140 can be used with one another interchangeably. For example, base elements 110, adjustment elements 120, 130 and/or cap elements 140 with different colors, different shapes, different heights, etc. can be used with one another. The base elements 110, adjustment elements 120, 130 and/or cap elements 140 can have standardized coupling mechanisms (e.g., coupling mechanisms 112, 114, 122, 124, 132, 134, 142) that are suitable for coupling to different types of base elements 110, adjustment elements 120, 130 and/or cap elements 140. For example, coupling mechanisms between different ones of the base elements 110, adjustment elements 120, 130 and/or cap elements 140 can be configured the same (or substantially the same) such that they can fit any two components of the system 100 together. In particular, coupling mechanism 114 of base element 110 and coupling mechanisms 124, 134 of the adjustment elements 120, 130 can be the same (or substantially similar to one another), and coupling mechanism 142 of the cap element 140 and coupling mechanisms 122, 132 of the adjustment elements 120, 130 can be the same (or substantially similar to one another). As such, a user can select to use any number of adjustment elements 120, 130, with a base element 110 and/or optionally the cap element 140 to adjust a height or other characteristic of the thumbstick TS.

In some embodiments, one or more components of the system 100 can be formed using additive manufacturing or three-dimensional (3D) printing, molding techniques, or other manufacturing methods.

While a single base element 110, two adjustment elements 120, 130, and a single cap element 140 are depicted in FIG. 1, it can be appreciated that any number of base elements, adjustment elements, or cap elements can be used in the system 100.

Figure 2:
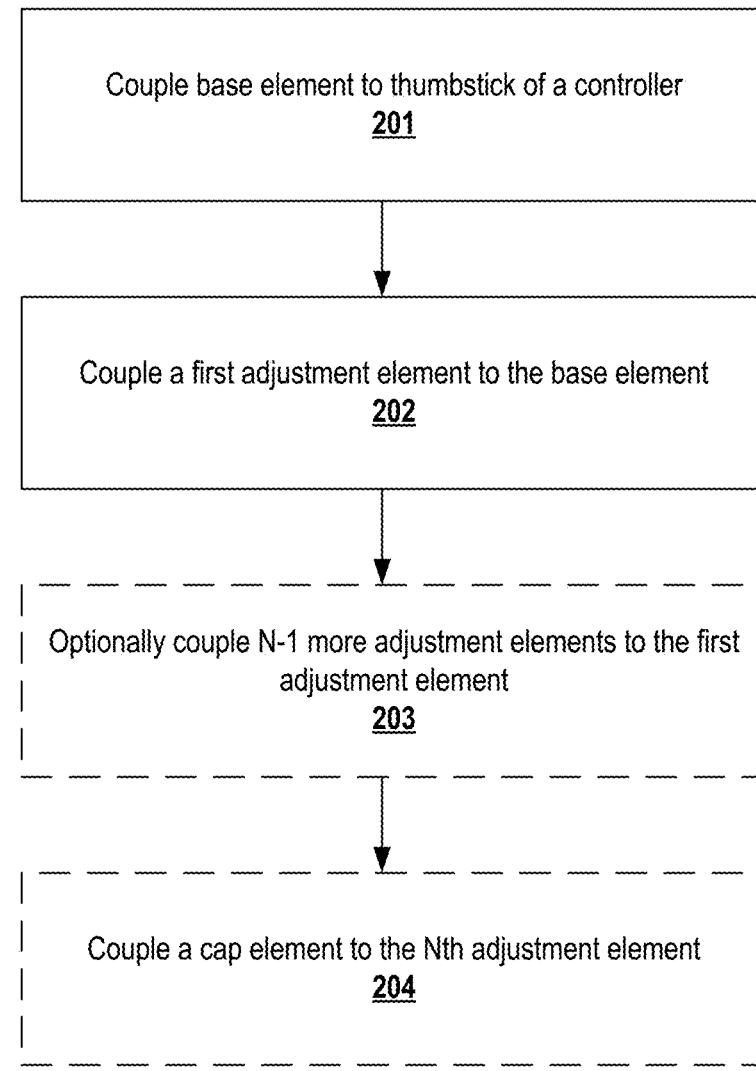
FIG. 2 is a flow chart of a method for assembling a system for adapting a thumbstick of a controller, according to embodiments.

FIG. 2 is a flow chart of an example method 200 of assembling a system for adapting a thumbstick TS of a controller CT, according to embodiments. The method 200 can include coupling a base element (e.g., base element 110) to the thumbstick TS of the controller CT, at 201. As described above, the base element can include mechanical, magnetic, and/or other coupling mechanisms for coupling to a top portion of the thumbstick TS. The method 200 can include coupling a first adjustment element (e.g., an adjustment element 120, 130) to the base element, at 202. As described above, each of the adjustment element and the base element can have coupling mechanisms that couple to one another to attach the adjustment element to the base element. The method 200 can optionally include coupling one or more additional adjustment elements to the first adjustment element, at 203. For example, a plurality of adjustment elements (e.g., in the form of wafers or other shapes and/or configurations) can be stacked on top of one another to form a column. The stacked column can extend from the thumbstick TS to increase a height and/or change another characteristic of the thumbstick TS (e.g., shift a centerline and/or longitudinal axis of the thumbstick TS, increase or decrease a size or diameter of the top of the thumbstick TS, etc.). The method 200 can optionally include coupling a cap element (e.g., cap element 140) to a top most adjustment element (e.g., an adjustment element at a top of a stack of adjustment elements, or the adjustment element that is most distal to or furthest set away from the thumbstick TS), at 204.

In use, a user can set up a system for adjusting a thumbstick TS in a plurality of different ways, e.g., using different numbers of adjustment elements, using different types of adjustment elements or cap elements, etc. For example, to better adapt a thumbstick TS for a game that requires pointing precision, a user can use a greater number of adjustment elements or adjustment elements with larger dimensions (e.g., height) to adjust the thumbstick TS to have a greater height. In some instances, a user may adapt different thumbsticks TS on a controller CT to have different heights, e.g., to configure a first thumbstick TS to be taller for better pointing precision, and a second thumbstick TS to be shorter for comfort. In addition, a user can choose to adjust a height of a thumbstick TS when interacting with different games that have different demands, when different individuals (e.g., a child vs. an adult) are using the controller CT, etc. Systems, devices, and methods described herein allow a user to adapt a thumbstick TS into a variety of different configurations using a modular, interlocking system.

In an example embodiment, a method for adjusting a height of a thumbstick of a controller includes attaching a base element to a top portion of the thumbstick; attaching a set of one of more adjustment elements to the base element in a stacked configuration in which each adjustment element from the set of adjustment elements is stacked on top of another adjustment element or the base element to form a stacked column; and attaching a cap element to a top most adjustment element from the set of adjustment elements. The cap element, the set of adjustment elements, and the base element, when attached to one another and to the thumbstick, are configured to increase the height of the thumbstick by a first predefined value. In some embodiments, the method further includes removing the cap element from the top most adjustment element; removing at least one adjustment element from the set of adjustment elements from the stacked column; and reattaching the cap element to a top most adjustment element from the remaining set of adjustment elements after the at least one adjustment element has been removed, such that the cap element, the remaining set of adjustment elements, and the base element increase the height of the thumbstick by a second predefined value less than the first predefined value. In some embodiments, the method further includes removing the cap element from the top most adjustment element; attaching at least one additional adjustment element to the stacked column; and reattaching the cap element to a top most adjustment element from the at least one additional adjustment element after the at least one additional adjustment element has been attached, such that the cap element, the set of adjustment elements, the at least one additional adjustment element, and the base element increase the height of the thumbstick by a third predefined value greater than the first predefined value.

Figure 3:
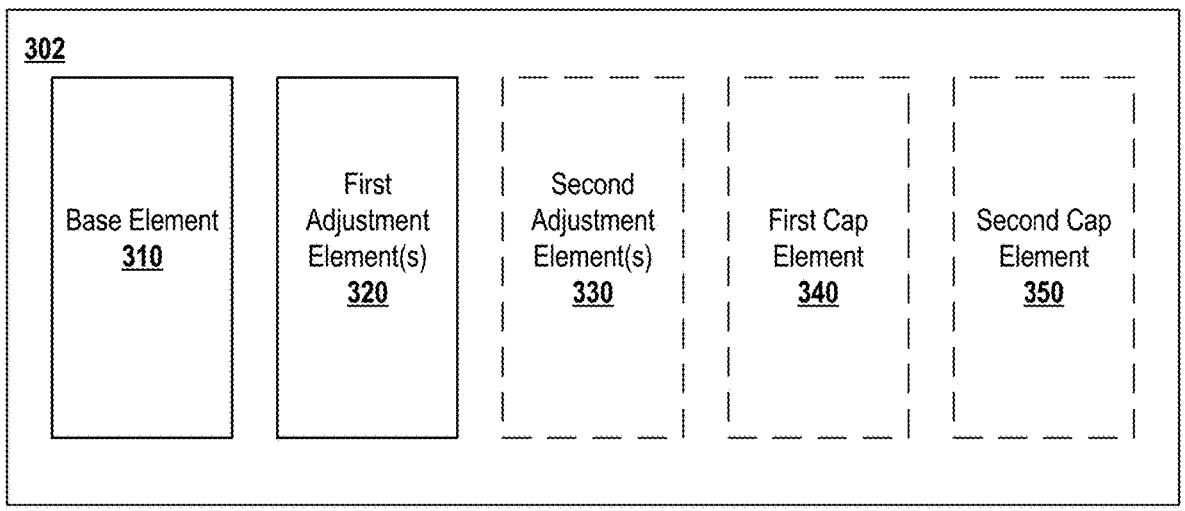
FIG. 3 is a schematic diagram of a kit including components of a system for adapting a thumbstick of a controller, according to embodiments.

FIG. 3 schematically depicts an example kit 301 for adapting a thumbstick of a controller, according to embodiments. The example kit 301 can include one or more components that are structurally and/or functionally similar to the components of the system 100, described above with reference to FIG. 1. For example, the kit 301 can include a base element 310 and a first adjustment element 320 and optionally a second adjustment element 330, a first cap element 340, and/or a second cap element 350.

In some embodiments, the first and second adjustment elements 320, 330 can be the same type of adjustment element. In some embodiments, the first and second adjustment elements 320, 330 can be different types of adjustment elements, e.g., have different color, have different shapes, have different heights, etc. The first and second adjustment elements 320, 330 can be configured for coupling to one another and to the base element 310, the first cap element 340, and/or the second cap element 350. In some embodiments, the first and second cap elements 340, 350 can be the same type of cap element, e.g., for replacement purposes when one cap element breaks. In some embodiments, the first and second cap elements 340, 350 can be different types of cap elements, e.g., where one or more of a surface texture, color, softness, shape, height, etc. are different between the two cap elements. In some embodiments, the first and second cap elements 340, 350 can be configured to couple to the base element 310, the first adjustment element 320, and/or the second adjustment element 330. In some embodiments, each of the first and second adjustment elements 320, 330 can be uniquely configured to couple to one of the first and second cap elements 340, 350. In other embodiments, any one of the first and second adjustment elements 320, 330 can be configured to any one of the first and second cap elements 340, 350.

In some embodiments, the kit 301 can be provided in a bag or enclosure 302. In some embodiments, the components of the kit 301 can be provided together in a connected board or set, where each component can be separated from the board by snapping or breaking them apart from the board. Further details of such an arrangement are described with reference to FIG. 5. In some embodiments, the components of the kit 301 can be formed using additive manufacturing or three-dimensional (3D) printing, molding techniques, or other manufacturing methods.

While a single base element 310, two adjustment elements 320, 330, and two cap elements 340, 350 are depicted in FIG. 3, it can be appreciated that any number of base elements, adjustment elements, or cap elements can be included in the kit 301. For example, additional types of base elements, adjustment elements, and/or cap elements can be included in a set to provide additional modular components that enable a user to adapt a thumbstick TS of a controller CT.

Figure 4:
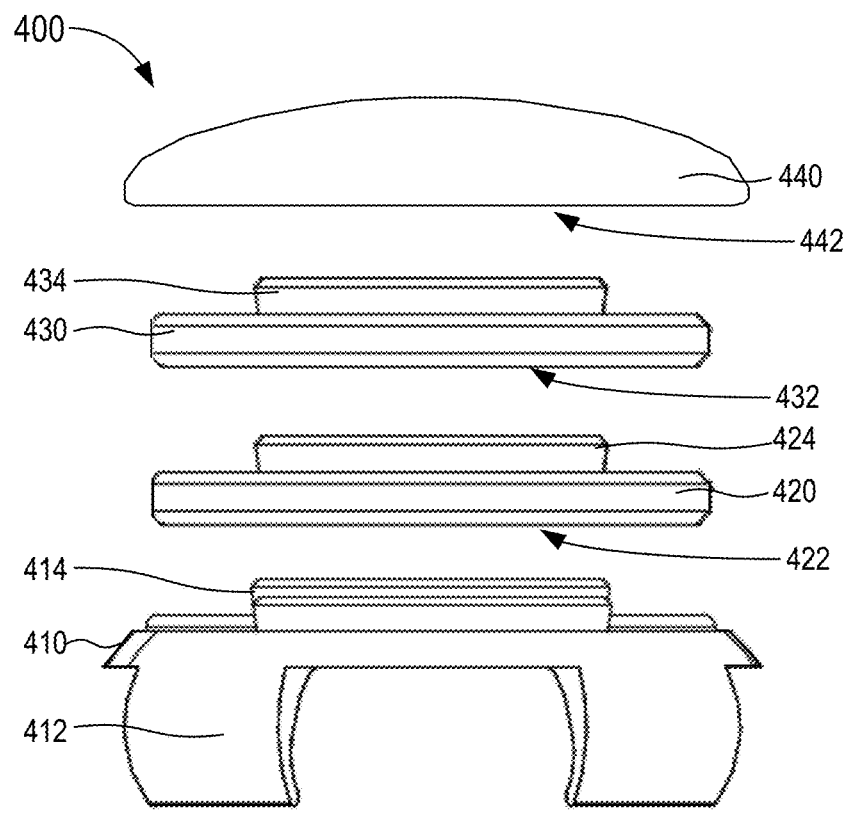
FIG. 4 depicts an exploded view of a system for adapting a thumbstick of a controller, according to embodiments.

FIG. 4 depicts an exploded view of an example system 400 for adjusting a thumbstick TS of a controller CT, according to embodiments. The system 400 can include components for adjusting a height of the thumbstick. The system 400 can include components that are structurally and/or functionally similar to those of other systems described herein (e.g., system 100). For example, the system 400 can include a base element 410, two adjustment elements 420, 430, and a cap element 440.

The base element 410 can include a coupling mechanism including a plurality of appendages 412. The appendages 412 can be spaced around a body of the base element 410, such that the appendages 412 can clip onto a top portion of a thumbstick TS. The appendages 412 can include two, three, four, five, six or more appendages. The appendages 412 can be flexible to allow the base element 410 to be clipped onto the top portion of the thumbstick TS, but be sufficiently rigid to ensure that the base element 410 remains securely attached to the thumbstick TS when a user is manipulating the thumbstick TS with the system 400 attached. The appendages 412 can be formed of the same material as the body of the base element 410, e.g., a rigid plastic, and/or be formed of a different material that is more deformable than the body of the base element 410. The appendages 412 can be long enough to reach around the top portion of the thumbstick TS but not be short and thin enough to not impede movement of the thumbstick TS (e.g., to not contact the body of the controller CT when the thumbstick TS is at full deflection).

The base element 410 can include a protrusion 414 (e.g., a platform or extension) that fits into a recess 422 of the adjustment element 420. The protrusion 414 and the recess 422 function as coupling elements that can mate or fit together to couple the adjustment element 420 to the base element 410. The protrusion 414 and the recess 422 can include surfaces and/or features that engage one another for the coupling. For example, the protrusion 414 can include a seat (e.g., a ridge) into which one or more edges or surfaces along a perimeter of the recess 422 can fit into to secure the adjustment element 420 to the base element 410. Alternatively, the protrusion 414 and the recess 422 can include threads such that the two can be threaded or screwed together to couple the base element 410 to the adjustment element 420.

The adjustment element 420 can have a protrusion 424 (e.g., a platform or extension) that can similarly fit into a recess 432 of the adjustment element 430, to couple the adjustment elements 420, 430 together. The protrusion 424 and the recess 432 function as coupling elements that can mate or fit together to couple the adjustment elements 420, 430. The protrusion 424 can be structurally and/or functionally similar to the protrusion 414, and the recess 432 can be structurally and/or functionally similar to the recess 422. For example, the protrusion 424 and the recess 432 can include surfaces and/or features that engage one another for the coupling. In some embodiments, the adjustment element 420 can be the same as the adjustment element 430. Alternatively, the adjustment elements 420, 430 can have different configurations and/or characteristics, e.g., a different protrusion and/or recess for coupling, a different color, a different height or diameter, etc.

The adjustment element 430 can be coupled to the cap element 440, e.g., via a protrusion 434 that fits into a recess 442 of the cap element 440. The protrusion 434 and the recess 442 function as coupling elements that can mate or fit together to couple the adjustment element 430 to the cap element 440. In some embodiments, the protrusion 434 can be structurally and/or functionally similar to other protrusions described herein, and the recess 442 can be structurally and/or functionally similar to other recesses described herein.

The adjustment elements 420, 430 can be implemented as thin wafers, e.g., thin circular pads, that can be stacked on top of each other and on top of the base element 410 to increase a height of the thumbstick TS. Each adjustment element 420, 430 can be thin to allow for finer adjustments in height, e.g., by stacking more or less adjustment elements 420, 430 on top of one another. In some embodiments, the adjustment elements 420, 430 can be between about 1 mm and about 2 mm in thickness. The thickness of the adjustment elements 420, 430 can depend on the mechanical properties of the specific material used to make the adjustment elements 420, 430, e.g., such that the adjustment elements 420, 430 have sufficient strength to withstand forces applied by a user during a gaming session.

The cap element 440 can have a similar diameter as a diameter of the thumbstick TS, and be shaped to have a concave, flat, or convex surface that is comfortable for a thumb of a user to rest on the cap element 440, e.g., for the duration of a game playing session. The cap element 440 can be made from one or more materials that provide comfort to the user. In some embodiments, the cap element 440 can be made from a single material, while in other embodiments, a bottom portion of the cap element 440 (e.g., where the cap element 440 couples to an adjustment element 420, 430 or the base element 410) can be made from a more rigid, sturdy material and the top portion of the cap 440 (e.g., where a user rests his thumb) can be made from a softer material such as silicone or include soft padding such as a gel pad.

Figure 5:
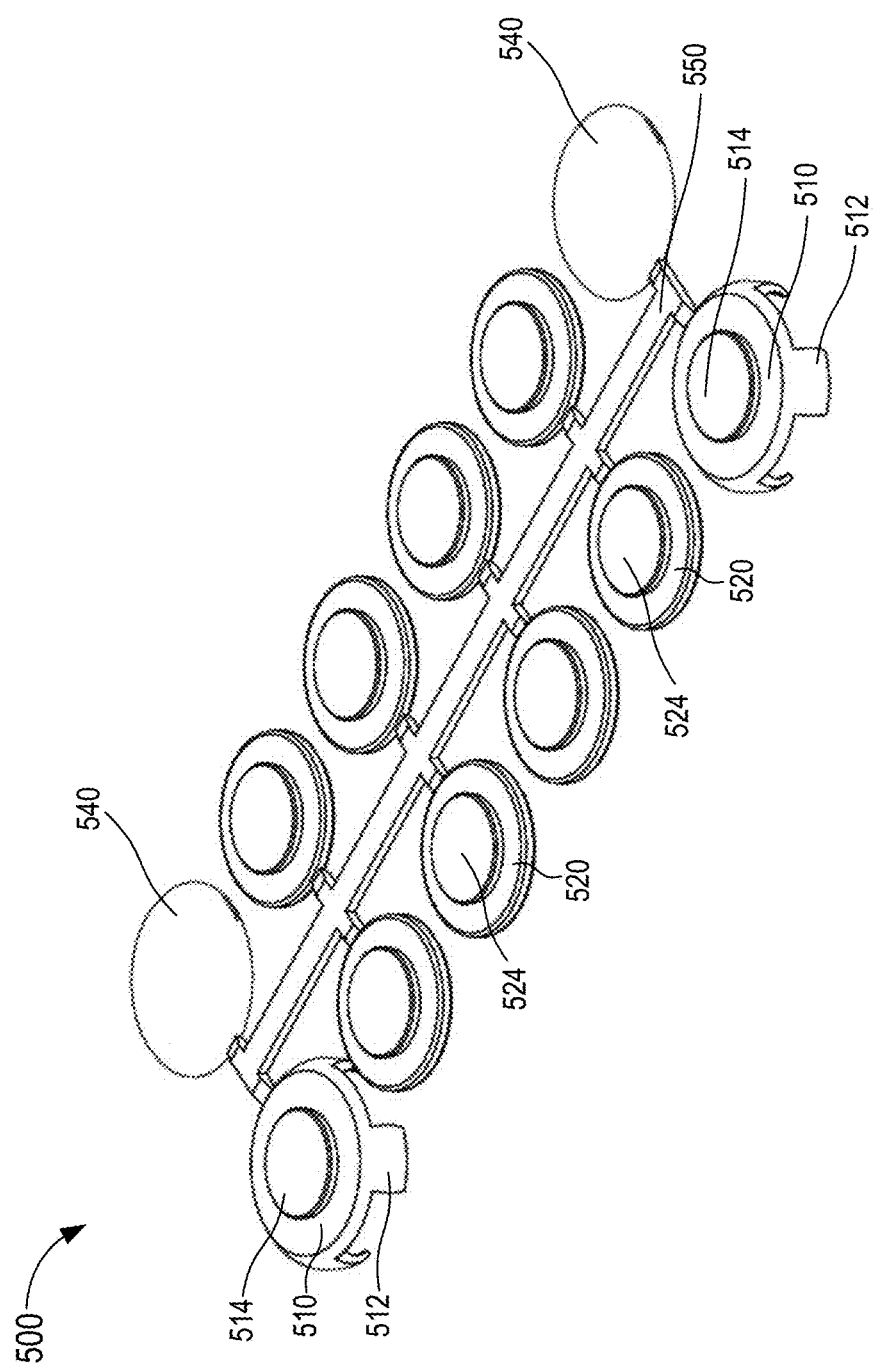
FIG. 5 depicts an arrangement of a kit including components of a system for adapting a thumbstick of a controller, according to embodiments.

FIG. 5 depicts an example arrangement of components of a system 500 for adjusting a thumbstick TS of a controller CT, according to embodiments. FIG. 5 depicts the components of the system 500 during storage and/or transport. As depicted in FIG. 5, the components of system 500 can be coupled together via one or more joining members 550. Prior to being assembled together on a thumbstick TS, the components can be separated from one another and the joining members 550 at one or more connection points.

The system 500 can include components that are structurally and/or functionally similar to those of other systems (e.g., system 100, 400) described herein. For example, the system 500 can include one or more base elements 510, one or more adjustment elements 520, and one or more cap elements 540. The base element(s) 510, adjustment element(s) 520, and cap element(s) 530 can include protrusions 514, 524 and/or recesses 522, 542 that are configured to function as coupling elements, which fit into and/or mate with one another to couple the base element(s) 510, adjustment element(s) 520, and cap element(s) 530 together (e.g., to stack the base element(s) 510, adjustment element(s) 520, and cap element(s) 530 together). The base element(s) 510 can include appendages 512 that can be configured to attach to the thumbstick TS.

In some embodiments, the system 500 can include multiple base elements 510, such that a user can select between different base elements, e.g., based on different characteristics of the base elements 510 (e.g., color, height, material, etc.). In some embodiments, the system 500 can include multiple cap elements 540, such that a user can select between different cap elements, e.g., based on different characteristics of the cap elements 540 (e.g., color, height, material, etc.). When assembled together, a single base element 510 and a single cap element 540 can be coupled together with one or more adjustment elements 520 coupled between them, e.g., to provide for variation in height and/or other characteristics of a thumb stick TS.

Figure 6A:
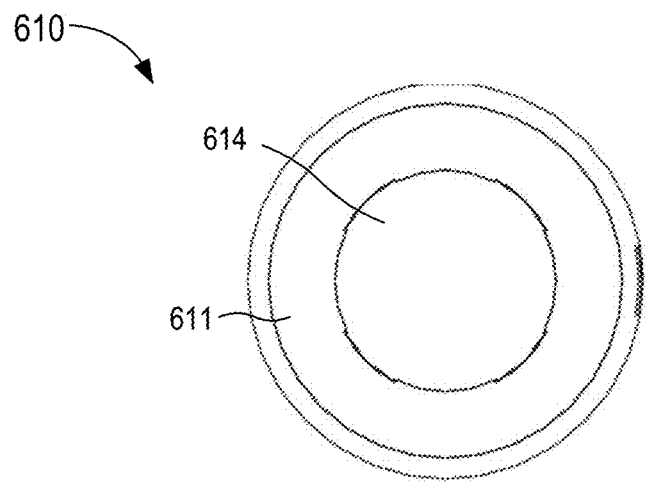
FIGS. 6A-6C depict different views of a base element of a system for adapting a thumbstick of a controller, according to embodiments.
Figure 6B:
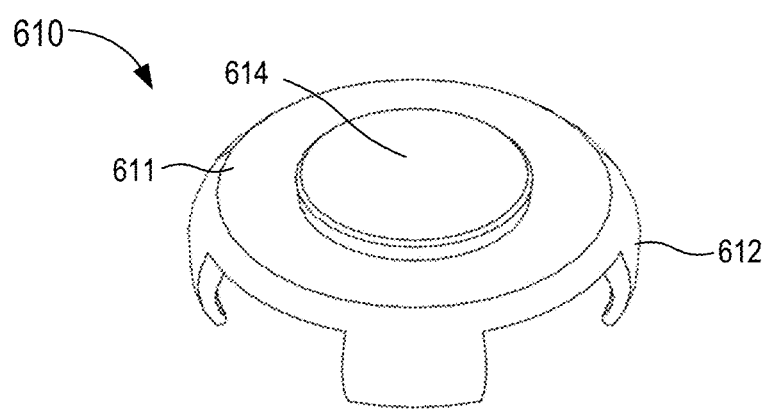
Figure 6C:
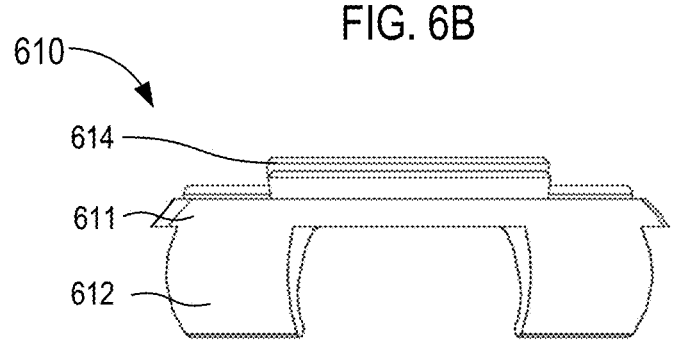

FIGS. 6A-6C provide detailed views of a base element 610 of a system for adjusting a thumbstick TS of a controller CT, according to embodiments. FIG. 6A depicts a top view of the base element 610, FIG. 6B depicts a perspective view of the base element 610, and FIG. 6C depicts a side view of the base element 610. The base element 610 can be structurally and/or functionally similar to other base elements described herein. For example, the base element 610 can include four appendages 612 that extend from a body 611 of the base element 610. The appendages 612 can be spaced from one another and configured to grip around a top portion of a thumb stick TS. The base element 610 can also include a protrusion 614 that extends from the body 611 of the base element 610, and can be configured to fit into (e.g., mate with) a recess or other portion of an adjustment element or a cap element (both not depicted in FIGS. 6A-6C) that allows the base element 610 to couple to the adjustment element or cap element.

Figure 7A:
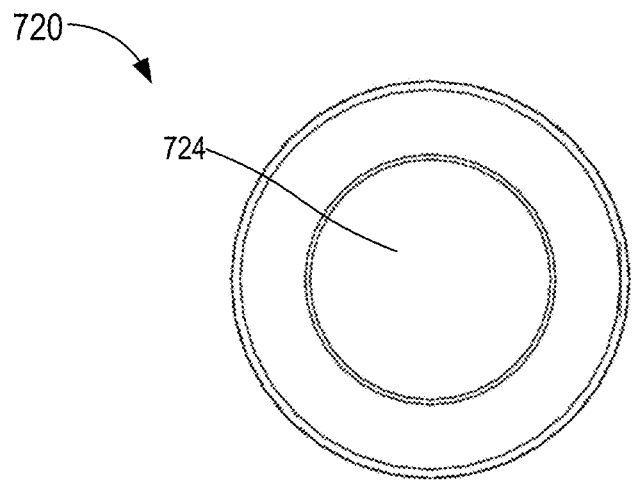
FIGS. 7A-7D depict different views of an adjustment element of a system for adapting a thumbstick of a controller, according to embodiments.
Figure 7B:
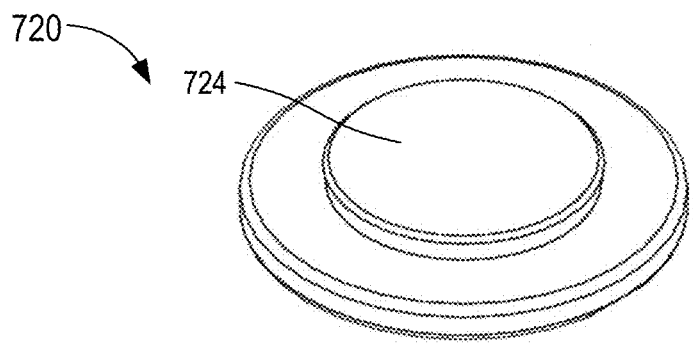
Figure 7C:
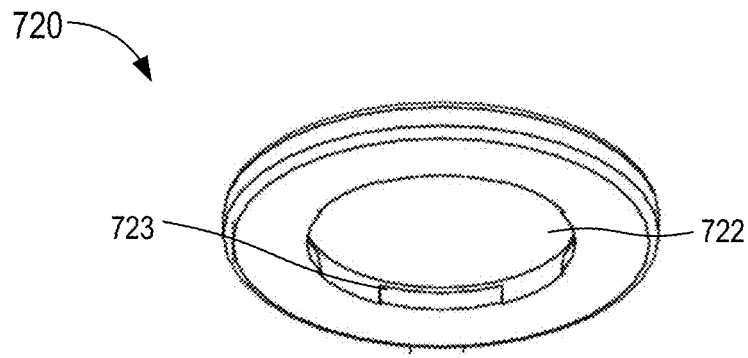
Figure 7D:
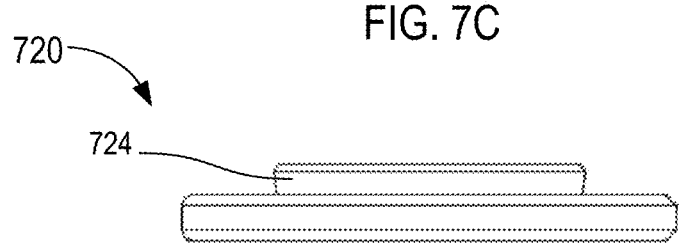

FIGS. 7A-7D provide detailed views of an adjustment element of a system for adjusting a thumbstick TS of a controller CT, according to embodiments. The adjustment element can be implemented as a wafer 720. FIG. 7A depicts a top view of the wafer 720, FIG. 7B depicts a top perspective view of the wafer 720, FIG. 7C depicts a bottom perspective view of the wafer 720, and FIG. 7D depicts a side view of the wafer 720. The wafer 720 can be structurally and/or functionally similar to other adjustment elements described herein. For example, the wafer 720 can include first and second coupling mechanisms for coupling to a base element, another adjustment element (e.g., wafer), and/or a cap element (not depicted in FIGS. 7A-7D). More specifically, the wafer 720 can include a recess 722 that can receive a portion of a base element or another adjustment element (e.g., wafer) and attach to that portion, e.g., via one or more coupling points 723. The coupling points 723 can be at corners that are disposed along a perimeter of the recess 722 and can take the structure of a ledge, tab, or other suitable structure for mating with a portion of the base element or other adjustment element (e.g., wafer). In an embodiment, the wafer 720 at the coupling points 723 can snap onto or into a receiving structure (e.g., a ridge, a groove, or other suitable structure) of the base element or other adjustment element (e.g., wafer) to secure the wafer 720 to that other component. The wafer 720 can have two, three, four, five, six or more coupling points 723, e.g., to provide sufficient engagement between the wafer 720 and a base element and another adjustment element (e.g., wafer). The wafer 720 can also have a protrusion 724 that can fit into a recess or other structure within another adjustment element (e.g., wafer) and/or cap element to couple the wafer 720 to that other component. For example, the protrusion 724 can include a receiving structure that is configured to snap into a recess of the other adjustment element (e.g., wafer) and/or cap element. In some embodiments, the protrusion 724 can be similar to the protrusion of a base element, such as, for example, a protrusion 614 of the base element 610.

Figure 8A:
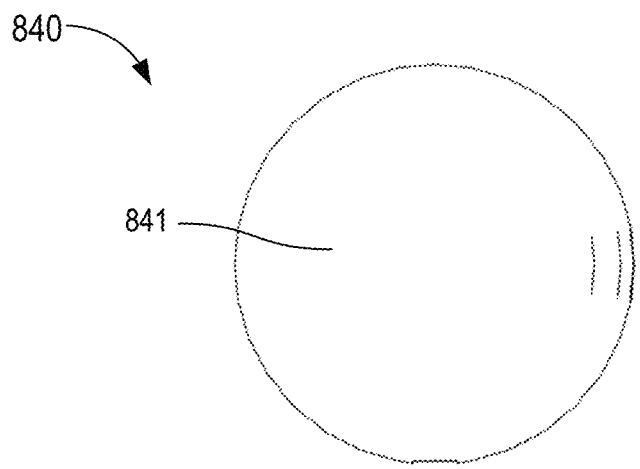
FIGS. 8A-8D depict different views of a cap element of a system for adapting a thumbstick of a controller, according to embodiments.
Figure 8B:
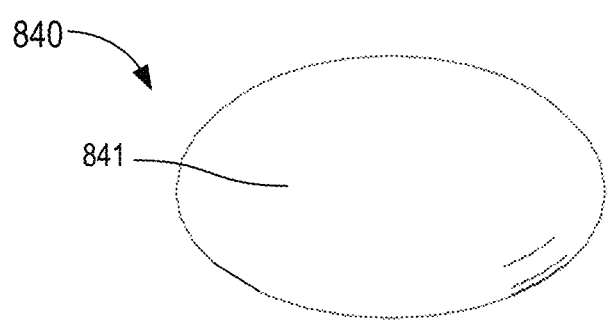
Figure 8C:
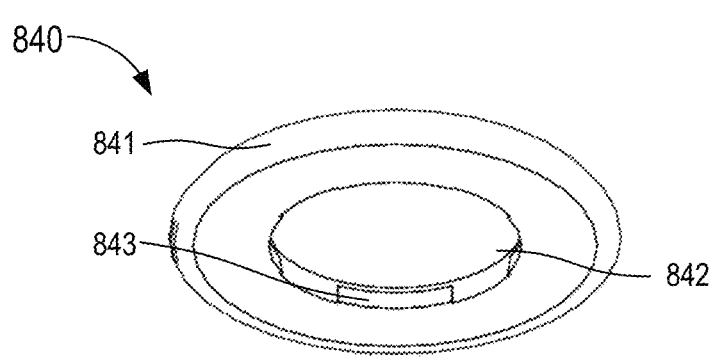
Figure 8D:
Figure 9:
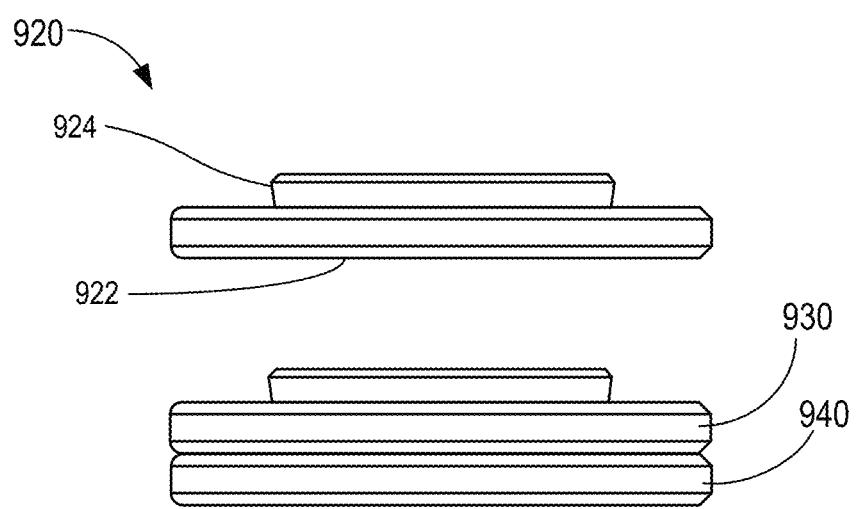
FIG. 9 depicts assembled components of a system for adapting a thumbstick of a controller, according to embodiments.

FIGS. 8A-8D provide detailed views of a cap element 840 of a system for adjusting a thumbstick TS of a controller CT, according to embodiments. FIG. 8A depicts a top view of the cap element 840, FIG. 8B depicts a top perspective view of the cap element 840, FIG. 8C depicts a bottom perspective view of the cap element 840, and FIG. 8D depicts a side view of the cap element 840. The cap element 840 can be structurally and/or functionally similar to other cap elements described herein. For example, the cap element 840 can include a recess 842 that can receive a portion of a base element or adjustment element (e.g., wafer) and attach to that portion, e.g., via one or more coupling points 843. The coupling points 843 can be at corners that are disposed along a perimeter of the recess 842 and can take the structure of a ledge, tab, or other suitable structure for mating with a portion of the base element or other adjustment element (e.g., wafer). In some embodiments, the recess 842 of the cap element 840 can be similar to the recess of an adjustment element, such as, for example, the recess 722 of the adjustment element 720. The cap element 840 can include a top portion 841 that has a diameter that is the same as (or substantially similar to) the diameter of the top portion of the thumbstick TS. The top portion 841 can have a shape that is suitable for engagement with a thumb of a user, e.g., has sufficient friction, is sufficiently soft for comfort, etc. The top portion 841 can have a concave, flat, or convex surface. The top portion 841 can be made from one or more materials to provide comfort to a user, e.g., one or more softer materials such as silicone or a gel. The remaining portions of the cap element 840 can be made from a more rigid or sturdy material, e.g., a hard plastic or metal.

In some embodiments, a base element as described herein and a cap element as described herein and optionally one or more adjustment elements as described herein can be stacked together (e.g., interlocked together) to form a tower or column that can be attached to a thumbstick TS of a controller CT to increase a height and/or adjust another characteristic of the thumbstick TS (e.g., shift a centerline and/or longitudinal axis of the thumbstick TS). In some embodiments, a base element as described herein and one or more adjustment elements as described herein and optionally a cap element as described herein can be stacked together (e.g., interlocked together) to form a tower or column that can be attached to a thumbstick TS of a controller CT to increase a height and/or adjust another characteristic of the thumbstick TS. The one or more adjustment elements can be stacked or interlocked, as depicted in FIG. 8, where adjustment elements 920, 930, and 940 are stacked together via one or more recesses 922 and protrusions 924.

Figure 10:
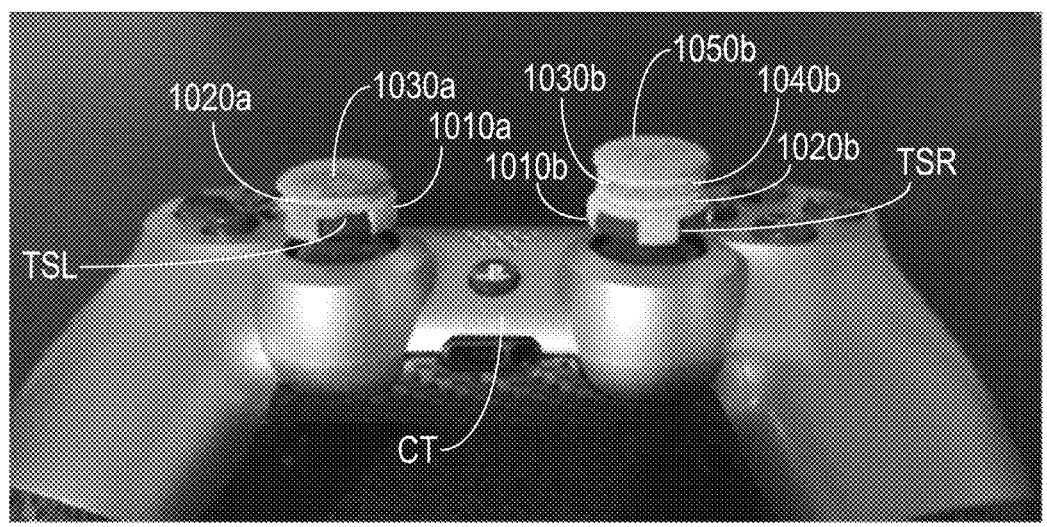
FIG. 10 depicts components of a system for adapting a thumbstick of a controller assembled on two thumbsticks of the controller, according to embodiments.

FIG. 10 depicts a controller CT that has a left thumbstick TSL and a right thumbstick TSR. A system 1000 for adjusting the thumbsticks TSL, TSR can be attached to the thumbsticks TSL, TSR to adjust a height and/or other characteristic of the thumbsticks TSL, TSR. As depicted, a base element 1010a, an adjustment element 1020a, and a cap element 1030a can be stacked (e.g., interlocked) together on top of the thumbstick TSL to increase a height of the thumbstick TSL by a first predefined height. In addition, a base element 1010b, a first adjustment element 1020b, a second adjustment element 1030b, a third adjustment element 1040b, and a cap element 1050b can be stacked (e.g., interlocked) together on top of the thumbstick TSR to increase a height of the thumbstick TSR by a second predefined height that is greater than the first predefined height. A user can select any combination of base element, adjustment element(s), and cap elements to configure the thumbsticks TSL, TSR to have a desirable height, e.g., for increasing pointing precision, for adapting the thumbsticks for greater comfort and/or different users, etc.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto; and that embodiments may be practiced otherwise than as specifically described and claimed without departing from the scope and spirit of the present disclosure. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope and spirit of the present disclosure.

As used herein, the terms "about" and/or "approximately" when used in conjunction with values and/or ranges generally refer to those values and/or ranges near to a recited value and/or range. In some instances, the terms "about" and "approximately" may mean within ±10% of the recited value.

Also, various concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The invention claimed is:

1. A kit for adjusting a height of a thumbstick of a controller, comprising:
   a base element including:
      a first coupling mechanism disposed on a top surface of the base element; and
      a second coupling mechanism configured to removably attach to a top portion of the thumbstick, the second coupling mechanism disposed on a bottom surface of the base element; and
   at least one adjustment element, each adjustment element including:
      a third coupling mechanism disposed on a top surface of the adjustment element; and
      a fourth coupling mechanism configured to removably attach to one of the first coupling mechanism or the third coupling mechanism, such that each adjustment element is removably coupled to one of the base element or another adjustment element, the fourth coupling mechanism disposed on a bottom surface of each adjustment element; and a cap element including:
a fifth coupling mechanism configured to removably attach to the first coupling mechanism when not attached to the third coupling mechanism such that the cap element can be directly coupled to the base element, the fifth coupling mechanism further configured to removably attach to the third coupling mechanism when not attached to the first coupling mechanism such that the cap element can be directly coupled to an adjustment element, the fifth coupling mechanism disposed on a bottom surface of the cap element; and a top portion having a diameter similar to that of the thumbstick, the top portion configured for engagement with a thumb of a user of the controller.

2. The kit of claim 1, wherein the first coupling mechanism is the same as the third coupling mechanism.

3. The kit of claim 1, wherein the fourth coupling mechanism is the same as the fifth coupling mechanism.

4. The kit of claim 1, wherein the second coupling mechanism includes a plurality of appendages that are configured to grip around the top portion of the thumbstick.

5. The kit of claim 4, wherein the plurality of appendages are spaced around a perimeter of the bottom surface of the base element.

6. The kit of claim 4, wherein the plurality of appendages includes at least three appendages.

7. The kit of claim 4, wherein the plurality of appendages are configured to flex to snap onto and grip around the top portion of the thumbstick.

8. The kit of claim 1, wherein each of the first coupling mechanism and the third coupling mechanism includes a protrusion, and each of the fourth coupling mechanism and the fifth coupling mechanism includes a recess, the protrusion of the first and third coupling mechanisms configured to fit into one of the recesses of the fourth and fifth coupling mechanisms.

9. The kit of claim 8, wherein each recess includes a plurality of corners that are configured to engage at a plurality of points with the protrusion fitted within that recess, such that the plurality of corners maintains a coupling between the base element, the cap element, or an adjustment element and another one of the base element, the cap element, or an adjustment element.

10. The kit of claim 9, wherein the plurality of corners includes four corners.

11. The kit of claim 1, wherein a height of each adjustment element is between about 1 mm and about 2 mm.

12. The kit of claim 1, wherein a combined height of the base element, the at least one adjustment element, and the cap element when coupled to one another in an interlocked configuration is between about 3 mm and about 13 mm.

13. The kit of claim 1, wherein the top portion of the cap element is made from a material that is softer than the fifth coupling mechanism and the bottom surface of the cap element.

14. The kit of claim 13, wherein the top portion of the cap element is made from silicone, a rigid plastic, or a metal.

15. A system, comprising:
a controller including a thumbstick;
a base element removably coupleable to a top portion of the thumbstick;
a set of one or more adjustment elements removably coupleable to the base element and to one another, the set of adjustment elements configured to be arranged in a stacked configuration in which each adjustment element is stacked on top of another adjustment element or the base element to form a stacked column; and
a cap element selectively and directly coupleable to the base element and to the set of adjustment elements,
the base element, the set of adjustment elements, and the cap element, when coupled to the thumbstick via the base element, is configured to increase a height of the base element by a predefined value.

16. The system of claim 15, wherein the base element, the set of adjustment elements, and the cap element, when coupled to the thumbstick via the base element, is further configured to shift a centerline of the thumbstick.

17. The system of claim 15, wherein the predefined value is between about 3 mm and about 13 mm.

18. The system of claim 15, wherein the thumbstick is a first thumbstick and the controller further includes a second thumbstick, the base element is a first base element, the set of adjustment elements is a first set of adjustment elements, the cap element is a first cap element, and the predefined value is a first predefine value, the system further comprising:
a second base element, a second set of one or more adjustment elements, and a second cap element that are configured to couple to one another and to the second thumbstick to increase a height of the second thumbstick by a second predefined value,
the second predefined value being different from the first predefined value.

19. The system of claim 18, wherein the second base element is identical to the first base element, each adjustment element from the second set of adjustment elements is identical to the adjustment elements from the first set of adjustment elements, and the second cap element is identical to the first cap element.

20. The system of claim 18, wherein the second set of adjustment elements includes a different number of adjustment elements than the first set of adjustment elements.

* * * * *